United States Patent [19]

von Nordenskjöld

[11] 4,448,689

[45] May 15, 1984

[54] APPARATUS FOR FINAL CLEARING OF WASTE WATER

[76] Inventor: Reinhart von Nordenskjöld, Am Jagdweg 4, D-8011 Solalinden, Fed. Rep. of Germany

[21] Appl. No.: 293,440

[22] Filed: Aug. 17, 1981

[30] Foreign Application Priority Data

Aug. 20, 1980 [DE] Fed. Rep. of Germany ....... 3031412

[51] Int. Cl.³ .............................................. B01D 43/00
[52] U.S. Cl. ..................................... 210/521; 210/522; 210/525; 261/120
[58] Field of Search ............... 210/521, 522, 538, 540, 210/208, 525, 526, 528; 261/120, 3

[56] References Cited

U.S. PATENT DOCUMENTS

| | | | |
|---|---|---|---|
| 2,366,898 | 1/1945 | Gurney | 210/208 |
| 3,067,878 | 12/1962 | Genter et al. | 210/521 |
| 3,613,889 | 10/1971 | Reed | 210/522 |
| 3,622,009 | 11/1971 | Bordner | 210/528 |
| 3,635,346 | 1/1972 | Zuckeman et al. | 210/208 |
| 3,779,910 | 12/1973 | Chatfield | 210/208 |
| 4,290,898 | 9/1981 | von Hagel et al. | 210/522 |

FOREIGN PATENT DOCUMENTS

| | | | |
|---|---|---|---|
| 1248650 | 10/1971 | United Kingdom | 210/521 |
| 740288 | 1/1978 | U.S.S.R. | 210/522 |
| 782827 | 1/1979 | U.S.S.R. | 210/540 |

Primary Examiner—Peter A. Hruskoci
Assistant Examiner—Sharon T. Cohen
Attorney, Agent, or Firm—Flynn, Thiel, Boutell & Tanis

[57] ABSTRACT

An apparatus for final clearing of waste water in a settling tank includes an inverted conical collecting basin having openings in the walls thereof. An annular air chamber encircles and is attached to the upper edge of the basin and floats in the waste water. Waste water enters the collecting basin through the openings therein and sludge in the water settles to the bottom of the basin. The cleared water at the top of the basin flows into an overflow receptacle and is removed therefrom by a pipeline. The sludge at the bottom of the basin is conveyed upwardly by a conveying device through a conveying pipe to a collecting receptacle and is removed therefrom by a pipeline.

14 Claims, 3 Drawing Figures 4,448,689

APPARATUS FOR FINAL CLEARING OF WASTE WATER

FIELD OF THE INVENTION

This invention relates to an apparatus for the final clearing and, more particularly, to such an apparatus for the final clearing of sludge from waste water, which includes a downwardly tapering collecting basin to which waste water is fed through at least one inlet, a conveying device cooperable with the lower area of the collecting basin for conveying sludge and waste water upwardly to a sludge pipeline for discharging the separated sludge, and an overflow receptacle for receiving the cleared waste water.

BACKGROUND OF THE INVENTION

One apparatus of the above-mentioned type is known. It is arranged as a stationary structure at the edge of a settling tank. The collecting basin is constructed as a trough with a V-shaped cross section, one V-leg being shorter than the other one and the shorter leg providing the waste water an access to the trough. At the base of the trough there is a conveying device in the form of a pipe having bores. The pipe terminates in an upwardly extending sludge return pipeline. An injector for supplying compressed air is provided in the pipeline, with the help of which compressed air sludge in the pipeline is conveyed and discharged.

A floating overflow receptacle for the cleared waste water is provided in the region of the water surface and is connected through a flexible waste water pipe to a stationary waste water pipeline.

In general, the conventional apparatus operates reliably. As desired, the sludge which settles in the collecting basin is concentrated and is then removed by the conveying device. The cleaned water can discharge through the overflow receptacle and the floating arrangement of the overflow receptacle ensures that, during water level variations, the selected discharge rate is not changed.

The conventional apparatus is, however, a stationary structure and therefore requires space outside or at the edge of the basin. It must be constructed relatively strongly, for example of concrete, since such structures are intended for long periods of use without repairs. Therefore, the expense in manufacturing the conventional apparatus is considerable, and appropriate considerations must be made during construction and dimensioning of the apparatus to ensure that it withstands the pressure of the earth and the lift caused by ground water, waste water, etc.

In some cases, particularly where in-ground basins are used, a concrete construction is not at all possible in consideration of the soil.

The greatest disadvantage of stationary systems, however, is that these systems are not flexible. If the settling tank is to be enlarged, a larger final clearing apparatus would have to be available in order to process the accumulating sludge and the waste water. In this case, the stationary clearing apparatus must be enlarged, insofar as this is possible with respect to the space available.

Therefore, the basic purpose of the present invention is to produce an apparatus of the above-mentioned type which is more economical to manufacture and more flexible during use than conventional systems.

SUMMARY OF THE INVENTION

This purpose is attained inventively by providing apparatus of the foregoing type which preferably has floating members and is arranged floatingly in the waste water.

The floating arrangement of the apparatus not only maintains a constant overflow rate, but maintains the collecting basin in a constant and established relationship with respect to the water level. This means that the entire arrangement automatically adjusts to all water level variations, which may be due partly to variations in the quantity of waste water provided during the course of the day and partly to environmental influences such as thunderstorms.

Through the floating arrangement, both during feeding into the collecting basin and also during discharge from same, a discharge takes place. Once adjusted, the through-flow rate is maintained. The apparatus can, based on a pregiven through-flow rate, be optimized with respect to its construction. In designing the collecting basin, the only through-flow rates which need to be considered are those pregiven from the overflow. Insofar as the overflow is adjustable, a minimum throughflow rate and a maximum through-flow rate are obtained and can then be considered during the dimensioning and design of the apparatus. Water level variations in the settling tank can, in contrast, be left unconsidered. The inventive apparatus can, for this reason, be built very compact and produces, through water level variations in its use basin, an extremely advantageous buffer volume.

Through the floating arrangement of the apparatus, large savings in manufacturing expenses are achieved. The collecting basin does not need to be designed as a permanent and fixed structure, for example of concrete, but may, for example, consist of metal. The flotation members provide sufficient stability for the collecting basin in the water. The pressure in the collecting basin is always the same as the pressure on the outside, and this means that forces which result from pressure differences need not be absorbed.

Through the floating arrangement, it is unnecessary to set up a special structure outside of the basin or at the edge of the basin. Thus, in addition to the significantly lower manufacturing costs, there is also the advantage that no space is needed for the inventive apparatus. Also, the apparatus has the advantage that settling tanks can be placed in those areas where, due to deficient subsoil, a stationary final clearer could not be installed.

The inventive apparatus can be premanufactured and, after setting up the settling tank, it is immediately available for use. In addition, it can be manufactured in a mechanical assembly technique in various sizes. This makes it possible, for example, to utilize in a single settling tank, in place of a large apparatus, several small ones in order for example to be able to finally clear water at several points in the settling tank simultaneously. If the capacity of a settling tank changes, because, for example, it has been enlarged, it is very easy to substitute a correspondingly larger or smaller clearing apparatus into the settling tank or to increase or reduce the number of final clearers in the tank.

If servicing of the final clearer should become necessary, it can be lifted from the basin with the help of a crane or can simply be pulled over the bank, and it is then available on land for this work. However, the inventive final clearer is designed to be extremely service-free. Its construction may, for example, consist of a fire-galvanized iron plate.

Finally, it is pointed out that the inventive apparatus is equally suited for use in small and large systems.

An advantageous further development of the invention provides that the collecting basin has an internally tapered shape with the tip pointing downwardly. This basic form is particularly advantageous because the sludge contained in the waste water can slide downwardly along the V-shaped walls to a collectiong location from which it is then sucked away. The entry of waste water from the settling tank into the collecting basin can occur through openings provided in the basin walls due to the water level in the basin being maintained lower than the level in the settling tank.

It is advantageous if the conveying device is a substantially vertical conveying pipe which ends near the bottom of the basin, in which pipe is an injector for supplying compressed air thereto. Sludge and waste water is thus moved upwardly through the conveying pipe from the collecting area of the basin and can then be separated out.

A simple but effective construction of the overflow receptacle results when it is an upwardly open collecting box, to which is connected a flexible waste water pipe. The collecting box can be arranged to be vertically adjustable and, to avoid a localized discharge flow, such flow can occur over a large portion of the circumference of or the entire circumference of the collecting basin. It is advantageous for this if the collecting box has an annular or partially annular form.

The separating and final clearing action can be further improved by providing a group of plates in the collecting basin. The plates can be designed as conical frustum surfaces and can be supported as to be vertically spaced one above the other on a central coaxial pipe so that they are inclined downwardly toward the basin wall at the same angle of inclination. Sludge which is contained in the waste water slides on the sloped plates toward the basin wall and is then collected at the lowermost point of the collecting basin, while the waste water rises upwardly between the plates, reaches the overflow and can be removed as cleared waste water.

BRIEF DESCRIPTION OF THE DRAWINGS

Exemplary embodiments of the invention are described hereinafter in connection with the drawings, in which.

DETAILED DESCRIPTION

Figure 1:
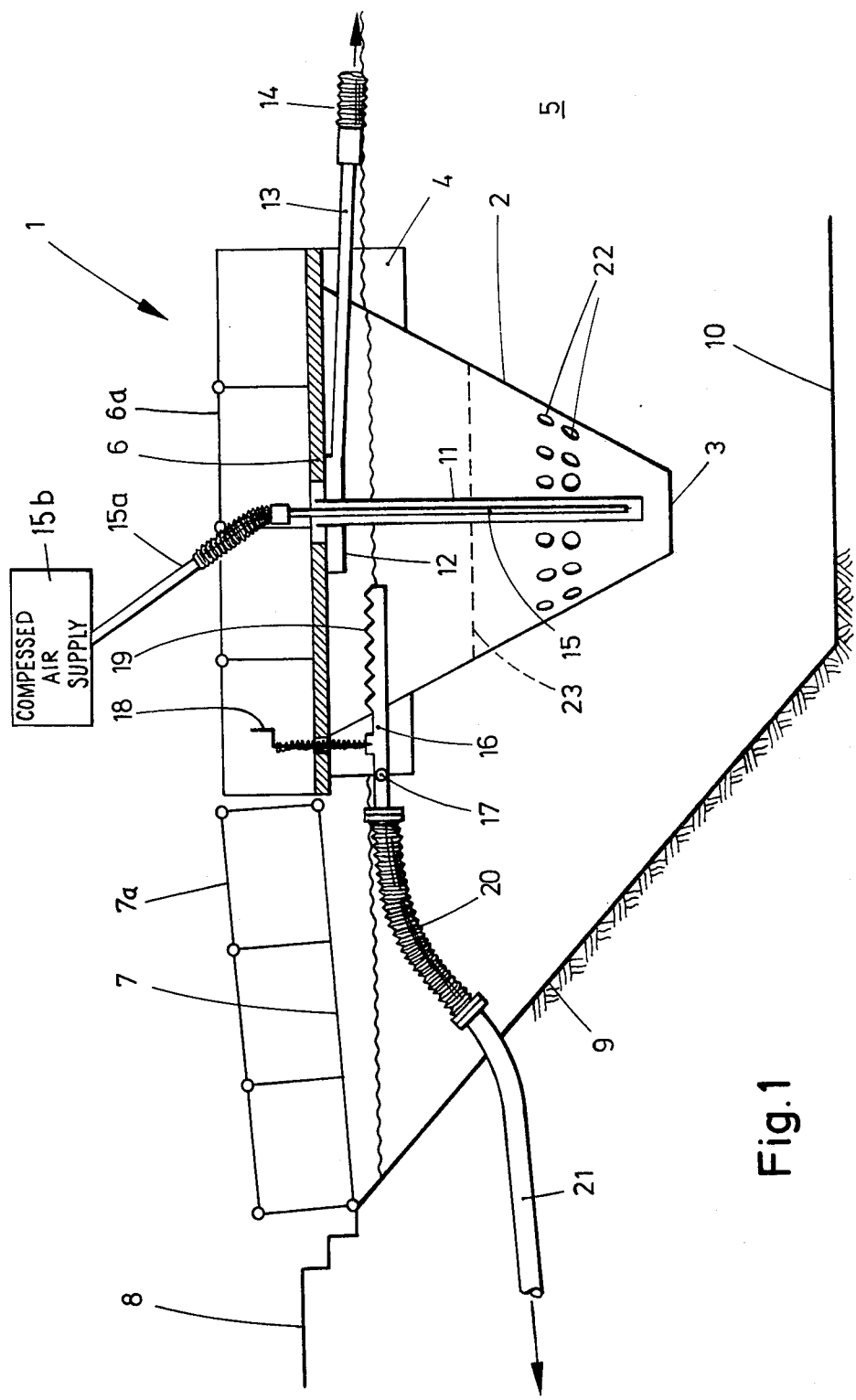
FIG. 1 is a schematic sectional side view of a first embodiment of the inventive apparatus.

FIG. 1 illustrates an apparatus 1 which is adapted for use for the final clearing of waste water. In particular, sludge which exists in the waste water is separated out and concentrated by the apparatus. The apparatus is also intended to separate the cleared waste water from the sludge.

The apparatus 1 has a collecting basin 2 which has internally tapered shape, here conical, and is suspended with the tip pointing downwardly. The tip is preferably slightly flattened to form a bottom 3 and, as described hereinbelow, the sludge collects in the area of the bottom 3.

Extending around and attached to the upper free edge of the collecting basin 2 is an annular air chamber 4 which serves as a lift member to support the collecting basin 2. The chamber 4 is dimensioned so that the collecting basin 2 floats in a settling tank or reservoir containing waste water 5 and is thus practically always submerged a constant amount into the water 5, regardless of water level variations.

The annular chamber 4 can be equipped with bulkhead partitions which divide it into several chambers. Where pipelines, etc. extend through the annular chamber, it can, if desired, be interrupted.

A patrolling platform 6 extends across the chamber 4 above the collecting basin 2, and also serves to support structure which will yet be mentioned. It forms the extension of a movable access ramp 7 which is connected to the bank 8 of the settling tank. From FIG. 1, one can recognize that the settling tank or reservoir is designed as an in-ground basin having a bottom 10 and sloped sides 9 extending between the bank 8 and the bottom 10. The access ramp 7 also serves to anchor the collecting basin 2 at its place of use in the settling tank.

In order to be able to compensate for water level variations, the access ramp 7 is pivotally connected to the bank 8 and platform 6. The access ramp 7 and the patrolling platform 6 are each equipped with a respective safety railing 7a or 6a. A vertical conveying pipe 11 is supported by the patrolling platform 6, has its open lower end located near the bottom 3 of the basin 2, and extends upwardly to a location above the water level of the waste water 5. Its upper end is surrounded by a collecting receptacle 12, from which a sludge return pipeline 13 extends outwardly. The top edge of the receptacle 12 is lower than the upper end of the conveying pipe 11. The sludge return pipeline 13 is slightly inclined downwardly and includes a flexible section 14 which extends to land, where the sludge is further used or stored.

An injector pipe 15 has its lower end located slightly above the lower end of the pipe 11, extends upwardly inside the conveying pipe 11, and is used for blowing compressed air downwardly into the conveying pipe 11. The compressed air is supplied to the injector pipe 15 by a conventional compressed air supply 15b through a pipeline 15a.

FIG. 1 illustrates, adjacent the connection between the access ramp 7 and the patrolling platform 6 at the collecting basin 2, an overflow receptacle 16 for receiving the cleared waste water. The overflow receptacle 16 is preferably an upwardly open collecting box of generally circular shape which can be pivoted about a horizontal axle 17 on the chamber 4 with the help of an adjusting mechanism 18. The discharge rate can be adjusted by this pivoting. The collecting box 16 has a serrated top edge 19 in order to keep floating sludge from entering it. The collecting box 16, which is supported on the collecting basin 2 with the help of the axle 17, is connected at its outer end to a flexible waste water pipe 20 which in turn is connected to a stationary waste water pipe 21 located on land which typically guides the cleared waste water to a conventional and not-illustrated tank.

The adjusting mechanism 18 preferably consists of a threaded spindle or shaft having a crank handle on the upper end, threadedly engaging a nut mounted in the platform 6, and rotationally supported at its lower end on the overflow receptacle 16. Manually rotating the threaded shaft causes it to move vertically relative to the platform 6, such that the collecting box 16 pivots around the axle 17 relative to the surface of the water inside the basin 2, thereby varying the quantity of water entering the box 16 across the serrated edge 19. This edge 19 functions as a flow control edge for controlling flow of cleared water from the top of the basin, and results in the surface level of the water in the basin being maintained below the surface level of the waste water in the settling tank, as illustrated by FIG. 1.

During operation, the inventive apparatus floats, due to the lifting force of the annular air chamber 4, without ground contact in the waste water 5 contained in the settling tank. The waste water 5 is introduced, together with all small particles floating therein, for example sludge, into the collecting basin 2 through openings 22 provided in the sides of collecting basin 2. Due to the generally conical shape of the basin 2, the sludge slides downwardly on its walls and settles into the bottom portion of the basin, adjacent the lower end of the pipe 11. By blowing compressed air through the injector pipe 15 into the inside of the conveying device 11, sludge and waste water contained therein are moved upwardly and flow over the upper end of the conveying pipe 11 into the collecting receptacle 12.

The overflow receptacle 16 is provided as an outlet for the cleared waste water. The water crosses the serrated edge 19 of the collecting box 16 at the lowest points thereon and passes into the flexible waste water pipe 20 and then into the stationary pipe 21.

Between the concentration zone for sludge near the basin bottom 3 and the clearing zone near the surface of the waste water 5 it is possible to provide, if desired, a floating filter 23, as indicated by a dashed line in FIG. 1. Often, a natural floating filter is formed by certain fractions of the sludge itself. This filter layer remains mostly in place in suspension and prevents, for example, fine sludge parts from moving upwardly. This layer makes it possible for the sludge parts to ball up and sink downwardly.

From the floating arrangement of the collecting basin 2 and the fastening of the overflow receptacle 16 directly on the basin 2, there results during operation the advantage that, in case of water level variations in the settling tank, the adjusted discharge rate through the pipes 20 and 21 does not change. To break up sludge which is, for example, too thick, it is possible to also provide a not-illustrated agitator in the area of the bottom 10. If running on the basin walls 9 as well, such agitator permits efficient operation with minimal inclination of the walls 9. This agitator could, for example, be similar to that illustrated in FIG. 3 and described hereinafter.

Figure 2:
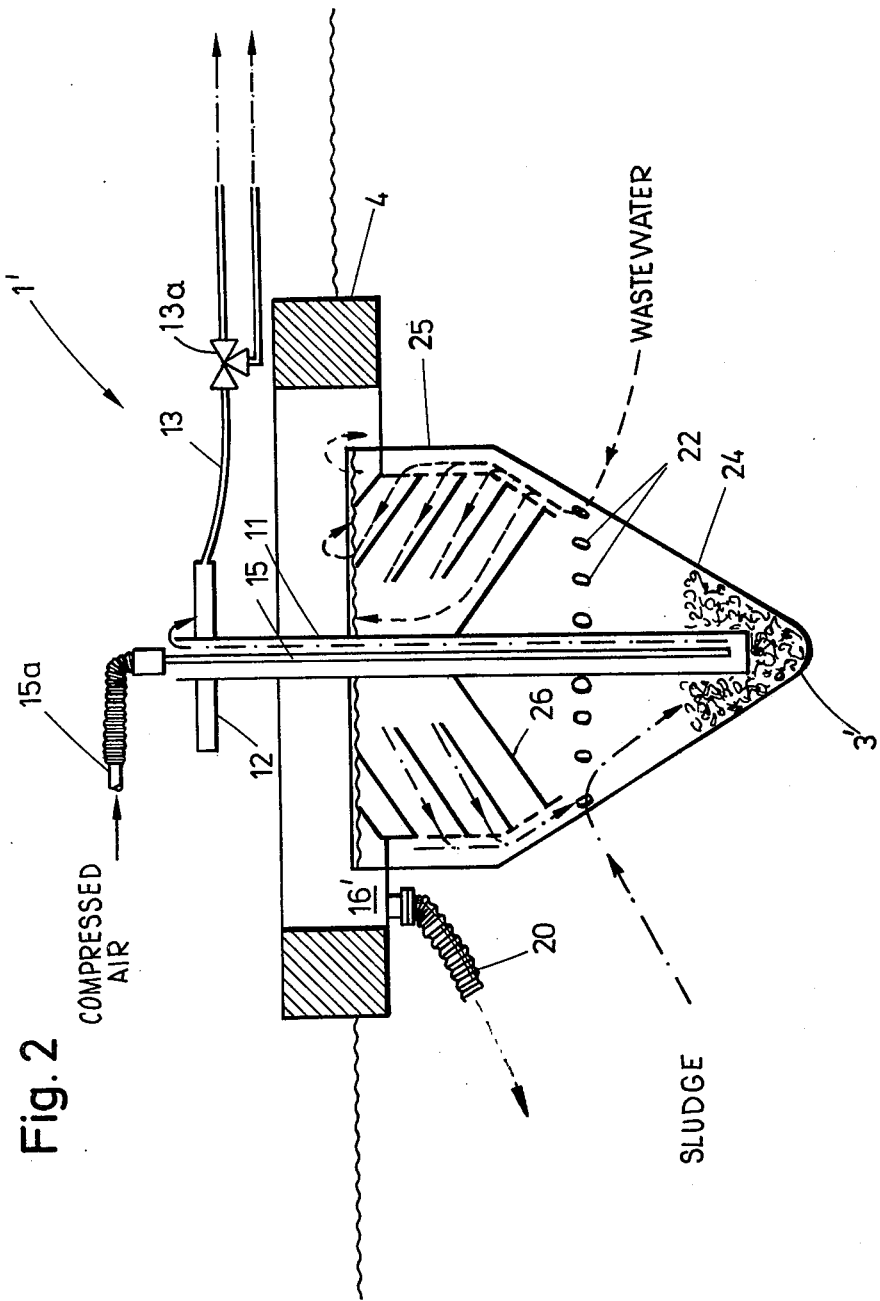
FIG. 2 is a schematic sectional side view of a second embodiment.

In the embodiment of FIG. 2, there exists also a floating collecting basin 24. The annular lift chamber 4 is substantially the same as in the exemplary embodiment of FIG. 1. Also in other respects there are similarities, for which reason the same reference numerals are used for the same parts and only the differences are discussed in detail.

The collecting basin again has a conically shaped portion with the tip extending downwardly, but at the upper edge of the conical portion is an upwardly projecting cylindrical section 25. The cylinder section serves to receive a set of plates 26. These plates are preferably constructed as conical frustum surfaces which are supported parallel to each other at equally spaced distances, one above the other, so as to be inclined downwardly and outwardly. They are preferably supported by the conveying pipe.

Also in this embodiment, the waste water, together with particles contained therein such as sludge, enters the basin 24 through openings 22 provided in the side of the basin 24. FIG. 2 illustrates, in a very simplified manner, the separating action of the apparatus. The dash-dotted lines indicate some paths of movement of the sludge, while the dashed lines show some paths of movement of the waste water. Sludge and waste water together enter the collecting basin 24 through the openings 22. This occurs as a result of the difference in water levels in the settling tank and inside of the collecting basin 24. In the embodiment of FIG. 1 and also in the embodiment of FIG. 2, the overflow receptacles 16 and 16' are arranged so that, within the collecting basin 24, the water level is lower than in the surrounding settling tank, as can clearly be recognized from FIGS. 1 and 2. The waste water to be cleared, together with the sludge therein, therefore enters automatically the collecting basins 2 and 24 through the openings 22.

Thereafter, the separation of sludge and waste water takes place. This is facilitated in part by the relatively calm inner flow within the collecting basin. Part of the sludge drops by itself to the bottom, as is indicated in FIG. 2. The clearing water moves upwardly and sludge which is still contained in the clearing water ultimately settles on the inclined plates 26 and slides outwardly on these, and is then guided to the basin wall and then to the lowermost point of the basin. From there, it is moved upwardly with the help of the conveying pipe 11 to the collecting receptacle 12 in the manner which has already been described and is then discharged through the sludge pipeline 13. It is also possible to provide a valve 13a in the sludge pipeline 13 to either move the sludge back for reuse in the basin or to transport it away for further processing. In this manner, a separation of excess sludge and return sludge is possible.

The waste water moves upwardly in the basin and reaches the overflow receptacle 16' which is nonvariable in its through-flow amount and has one end of the flexible waste water pipe 20 attached at a location on its bottom. The overflow 16' is annular and extends around the collecting basin. The annular air chamber 4 extends around the outside of the overflow receptacle 16'. The illustrated overflow receptacle 16' could, if desired, be adjusted in its through-flow amount by varying the extent to which the collecting basin is submerged. For this purpose, ballast could be used or the relative lift of the chamber 4 could be changed.

The plates 26 increase the separating action of the apparatus. The sludge, after entering the plates 26, will come to rest after a very short period of time on the plates 26 and is thus collected, concentrated and more quickly guided to the bottom of the basin.

To prevent the sludge which has already accumulated on the plates 26 from being carried upwardly by the flow of waste water continuously entering through the openings 22, sludge discharge rails can be provided in the area of the openings 22 in front of the entrance into the plates 26, which rails are for example arranged on the plates 26 and assure an unhindered discharge of the already-collected sludge toward the bottom 3 in spite of the in-flow of waste water.

Even though the illustrated collecting basins 2 and 24 each have a rotationally symmetric design, each of these basins can also be constructed as a polygon or a rectangle. The overflow receptacle may also be designed differently, for example in the form of an overflow receptacle which is adjustable in height in a vertical direction. The conveying device 11 can also be provided with a conventional pump instead of the air injector 15 in order to move the accumulated sludge upwardly into the collecting receptacle 12, or to branch same off at a different place.

In general, the inventive apparatus is suited for separating components having different specific weights. In the present case, these are waste water and sludge, but the invention is not limited to the clearing of waste water.

Figure 3:
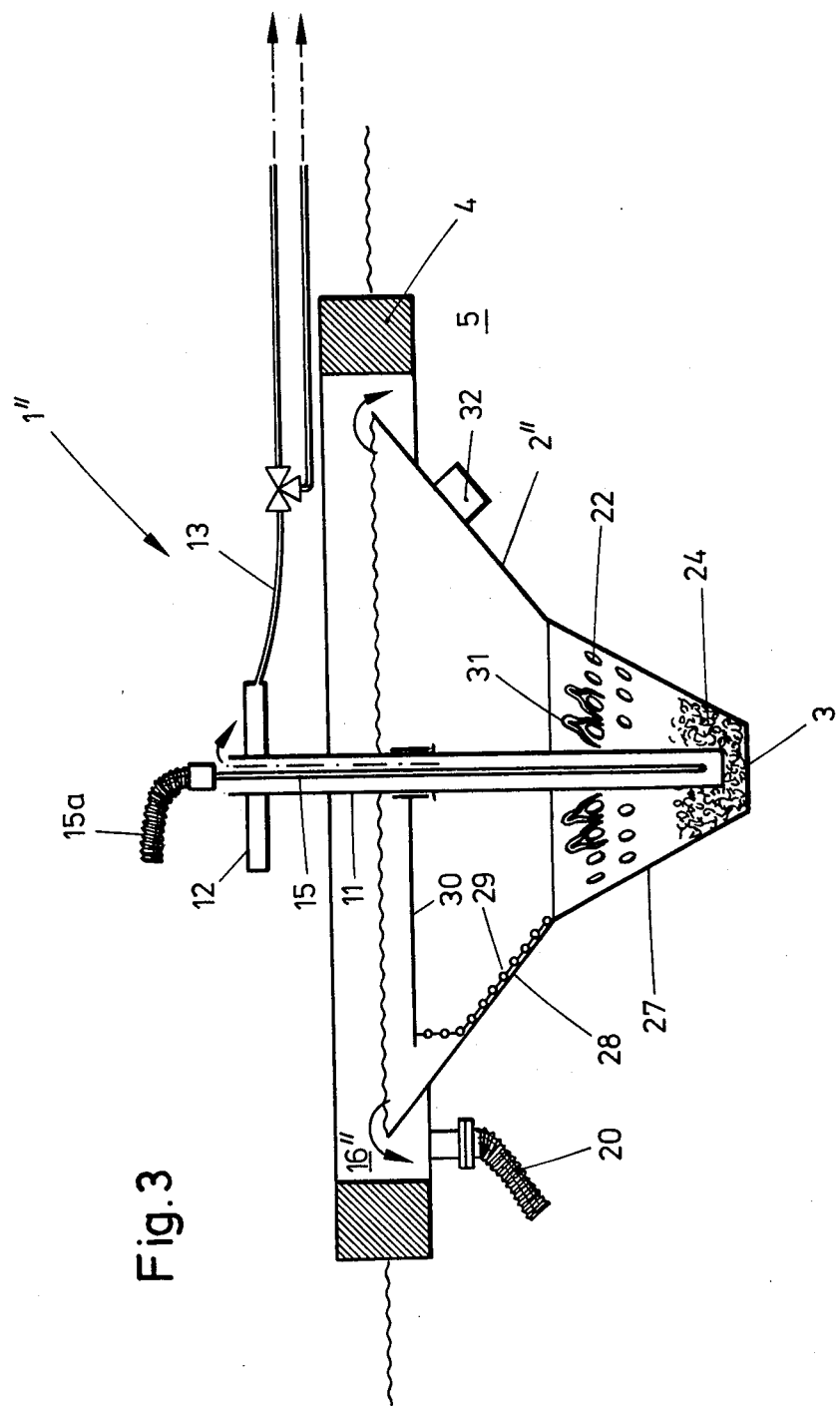
FIG. 3 is a schematic sectional side view of a third embodiment.

FIG. 3 illustrates a third embodiment of the invention. To avoid repetition, reference is made to the description of the first two embodiments and the same reference numerals are used for the same or similar parts.

In the third embodiment, the collecting basin 2" is divided into a lower basin 27 with steeply inclined walls and an upper basin 28 with more gently inclined walls. The angle of pitch of the steeper wall is preferably about 30 degrees with respect to the vertical, while the angle of the wall 28 is preferably about 50 degrees with respect to the vertical. Through the lesser incline of at least a portion of the basin wall, here the wall of the upper basin 28, a very large surface is provided within the collecting basin and helps to calm the flow during discharge of water to the overflow receptacle 16, thus improving the quality of the separating function of the apparatus.

The wall of the lower basin part 27 is sufficiently steep that the accumulating sludge cannot cling to it and slides automatically toward the bottom 3. To avoid a possible adhering of the sludge to the walls of the upper basin part 28, an agitator can be provided. In the present case, the agitator includes a link chain 29, which is secured at the free end of a horizontal arm 30. The arm is rotationally supported for 360° movement about a vertical axis, for example the conveying pipe 11, and is rotationally driven by a drive mechanism which is conventional and not illustrated. The arm 30 drags the chain across the basin wall, after which any clinging sludge is loosened and slides downwardly. The chain 29 is dimensioned in the present case so that it only sweeps across the wall of the upper basin part 28, but it could be sufficiently long so that it also sweeps across the wall of the lower basin part 27.

The agitator may be constantly in operation or may be switched on intermittently. In most cases, it will be sufficient if it sweeps over the basin wall at a very low speed.

To prevent sludge which is sliding toward the bottom 3 from being influenced by the water which is flowing inwardly through the openings 22, guide members 31 are provided on the basin wall adjacent the openings 22 and are, in the present case, hooklike and of inverted Y-shape and extend inwardly from the basin wall above and laterally of some or all of the openings 22. The sludge is guided around the openings 22 by the guide members 31, so that it is not carried upwardly again by the waste water which is flowing in through the openings 22. The guide members 31 can be designed so that, for a longer chain 29, the operation of the agitator is not hindered.

To keep the sludge sliding downwardly on the basin walls, it is also possible to provide a vibrating or swinging mechanism 32 to vibrate the wall of the basin 2 or to swing it. It is also possible to permit the entire basin to rotatingly swing about its vertical axis. The vibrating and swinging mechanism can also be viewed as an agitator and can serve during winter operation to prevent the apparatus from freezing up or to facilitate thawing of the apparatus if it has frozen.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for separating cleared water from sludge-containing water, comprising:
   a basin having wall means defining therein a chamber for separating cleared water from sludge;
   means for supporting said basin in a reservoir of sludge-containing waste water;
   outlet means for receiving the cleared water from the upper region of said chamber, said outlet means including a flow control edge positioned at an elevation below the surface level of the waste water in the reservoir for maintaining the surface level of the cleared water in the basin at an elevation lower than that of said waste water surface level;
   opening means in the wall means of said basin at a location spaced upwardly a substantial distance above the bottom of the basin for permitting flow of waste water from the reservoir through the opening means into the chamber due to the surface level of cleared water in the basin being lower than the surface level of waste water in the reservoir, said opening means providing the sole communication between said reservoir and said chamber;
   said basin having a vertically elongated tapering wall portion which projects upwardly from said opening means, and is of a diverging tapered configuration as said side wall portion projects upwardly said basin also having a bottom portion positioned below said opening means for collecting said sludge therein, said bottom portion being free of openings which communicate with said waste water in said reservoir; and
   means communicating directly with said bottom portion for removing sludge therefrom.

2. An apparatus according to claim 1, wherein said tapered wall portion is annular and said opening means includes a plurality of openings disposed in circumferentially spaced relationship relative thereto.

3. An apparatus according to claim 1, wherein said tapered wall portion is annular and said opening means includes a plurality of openings disposed in spaced relationship within at least one row which extends circumferentially around said basin.

4. An apparatus according to claim 3, wherein each said opening has a respective guide member which is fixed to and projects inwardly from said wall means directly above the respective opening for guiding sludge downwardly along said wall means into said bottom portion of said basin.

5. An apparatus according to claim 3, wherein said openings are spaced downwardly from the surface level of the water in the basin by a distance which is greater than the spacing of the openings from the bottom of the basin.

6. An apparatus according to claim 3, wherein said chamber, in the vicinity of said openings, is free of obstructions so as to permit the waste water flowing inwardly through said openings to immediately flow upwardly toward the upper region of the basin.

7. An apparatus according to claim 1, wherein said outlet means includes an upwardly opening overflow receptacle which is supported in said basin for limited, approximately vertical movement and has said flow control edge thereon over which the cleared water flows into said overflow receptacle from said basin, and includes means for controlling said movement of said overflow receptacle; and discharge conduit means communicating with said overflow receptacle for removing the cleared water therefrom.

8. An apparatus according to claim 7, wherein said edge of said overflow receptacle is serrated, wherein said overflow receptacle is supported for limited pivotal movement about a generally horizontal axis relative to said basin, and wherein said means for controlling movement of said overflow receptacle includes a generally vertical threaded spindle having its lower end pivotally supported on said overflow receptacle at a location spaced from said pivot axis and threadedly engaging a nut fixedly supported on said basin.

9. An apparatus according to claim 1, wherein said outlet means includes an annular receptacle encircling the upper end of said basin, said basin having an upper edge which defines said flow control edge and permits the cleared water to flow from said basin over said upper edge into said annular receptacle, and discharge conduit means communicating with said annular receptacle for removing cleared water therefrom.

10. An apparatus according to claim 9, wherein said supporting means includes annular means disposed in surrounding relationship to an upper end portion of said basin to permit the basin to be floatingly supported in the reservoir, said annular means being spaced radially outwardly from the upper edge of said basin for defining said annular receptacle therebetween.

11. An apparatus according to claim 1, wherein said means communicating directly with said bottom portion for removing sludge therefrom includes pipe means which extends downwardly into said basin from the open end thereof and communicates directly with the sludge which collects in the bottom portion of said basin, said pipe means extending substantially along the central vertical axis of the basin, and a plurality of vertically spaced, substantially parallel, downwardly and outwardly inclined frusto-conical plates encircling and supported on said pipe means at a location disposed above said opening means, said water passing between said plates as it flows from said opening means to said outlet means.

12. An apparatus according to claim 1, wherein said tapered wall portion is annular and projects downwardly past said opening means and defines a surrounding annular side wall of said bottom portion of said basin.

13. An apparatus according to claim 1, wherein said basin is, over at least a major extent, of the vertical height thereof, formed- of a downwardly tapering frusto-conical configuration, said frusto-conical configuration extending through both the tapered wall portions as defined above said opening means and also through said bottom portion for permitting concentration of the sludge which collects therein.

14. An apparatus according to claim 1, wherein said basin includes a downwardly tapering frusto-conical portion of substantial vertical extent, said frusto-conical portion defining both said bottom portion and said tapered wall portion of said basin, said opening means including a plurality of openings disposed in spaced relationship within a row which extends substantially circumferentially of the frusto-conical portion, said openings being disposed at a level which is spaced upwardly a substantial distance from the bottom of said basin but is also spaced downwardly a substantial distance from the surface level of water in the basin, said openings being closer to the bottom of the basin than to said surface level, said supporting means including means for floatingly supporting the basin in the reservoir, said outlet means including an annular outlet receptacle disposed in surrounding relationship to the upper edge of said basin, said upper edge defining said flow control edge for permitting cleared water to flow from said basin over said upper edge into said annular receptacle, and said means for removing sludge from said bottom portion including discharge conduit means having an inlet end which communicates directly with the bottom portion of said basin for removing sludge therefrom and for discharging said sludge at a remote location.

* * * * *

UNITED STATES PATENT AND TRADEMARK OFFICE
CERTIFICATE OF CORRECTION

PATENT NO. : 4 448 689
DATED : May 15, 1984
INVENTOR(S) : Reinhart von NORDENSKJOELD It is certified that error appears in the above-identified patent and that said Letters Patent is hereby corrected as shown below:

Col. 8, line 41; delete "side".

Signed and Sealed this

Twenty-second Day of January 1985

[SEAL]

*Attest:*

DONALD J. QUIGG

*Attesting Officer*     *Acting Commissioner of Patents and Trademarks*